US010338231B2

(12) United States Patent
Wallace et al.

(10) Patent No.: US 10,338,231 B2
(45) Date of Patent: Jul. 2, 2019

(54) HARDWARE FRONT-END FOR A GNSS RECEIVER

(71) Applicant: TRIMBLE NAVIGATION LIMITED, Sunnyvale, CA (US)

(72) Inventors: Gregory Wallace, Sunnyvale, CA (US); Shawn D. Weisenburger, Denver, CO (US)

(73) Assignee: TRIMBLE INC., Sunnyvale, CA (US)

( * ) Notice: Subject to any disclaimer, the term of this patent is extended or adjusted under 35 U.S.C. 154(b) by 690 days.

(21) Appl. No.: 14/954,310

(22) Filed: Nov. 30, 2015

(65) Prior Publication Data
US 2017/0153332 A1 Jun. 1, 2017

(51) Int. Cl.
G01S 19/36 (2010.01)
H01Q 21/06 (2006.01)
G01S 19/32 (2010.01)
H01Q 25/02 (2006.01)
H01Q 1/22 (2006.01)
H01Q 9/04 (2006.01)

(52) U.S. Cl.
CPC ............. G01S 19/36 (2013.01); G01S 19/32 (2013.01); H01Q 1/2291 (2013.01); H01Q 9/0414 (2013.01); H01Q 21/065 (2013.01); H01Q 25/02 (2013.01)

(58) Field of Classification Search
CPC ....... G01S 19/36; G01S 19/32; H01Q 9/0407; H01Q 21/065; H01Q 21/28
USPC .................................................... 342/357.72
See application file for complete search history.

(56) References Cited

U.S. PATENT DOCUMENTS 5,003,318 A * 3/1991 Berneking ........... H01Q 9/0414
343/700 MS
5,883,597 A * 3/1999 DeWulf .................. G01S 19/32
342/357.72

(Continued)

FOREIGN PATENT DOCUMENTS

WO WO-2011113540 A2 * 9/2011 ............. G01S 19/33

OTHER PUBLICATIONS

"The Digital Front-end of Software Radio Terminals", Hentschel et al., IEEE, vol. 6, Issue: 4, Date of Publication: Aug. 1999, Print ISSN: 1070-9916, NSPEC Accession No. 6365665.*

(Continued)

Primary Examiner — Vladimir Magloire
Assistant Examiner — Nuzhat Pervin
(74) Attorney, Agent, or Firm — Marsh Fischmann & Breyfogle LLP; Kent A. Lembke; Robert G. Crouch

(57) ABSTRACT

A hardware front-end for a software-defined GNSS receiver, which includes an antenna connected to a transmission line that is connected to a pair of separate circuits, one for receiving L1 signals and one for receiving L2 signals. Each circuit includes at least one bandpass filter, at least one LNA, and a single-chip GNSS receiver that receives analog RF signals and provides digitized I and Q signals. The pair of circuits differ in that a first one is designed to receive, filter, and amplify RF signals at the L1 frequency corresponding to the designed input frequency of the receiver and the second one is designed to receive, filter, and amplify RF signals at the L2 frequency, which is significantly different from the first frequency. The second circuit also includes a mixer to convert the L2 frequency to the L1 frequency, so that a similar receiver can be used in each circuit.

21 Claims, 9 Drawing Sheets

(56) References Cited

U.S. PATENT DOCUMENTS

| | | | | |
|---|---|---|---|---|
| 5,914,944 | A * | 6/1999 | Haugli | H04B 7/18513 370/320 |
| 6,049,278 | A * | 4/2000 | Guthrie | H01Q 1/2225 340/572.7 |
| 6,069,583 | A * | 5/2000 | Silvestrin | G01S 19/29 342/357.27 |
| 6,140,967 | A * | 10/2000 | Kolsrud | H01Q 1/38 343/700 MS |
| 6,359,588 | B1 * | 3/2002 | Kuntzsch | H01O 9/0407 343/700 MS |
| 7,035,661 | B1 * | 4/2006 | Yun | H04W 52/42 370/277 |
| 7,460,615 | B2 * | 12/2008 | Kunysz | G01S 19/32 342/352 |
| 8,217,833 | B2 * | 7/2012 | Webber | G01S 19/32 342/357.75 |
| 8,830,123 | B2 * | 9/2014 | Rao | G01S 19/24 342/357.63 |
| 9,374,121 | B2 * | 6/2016 | Weissman | H04B 1/40 |
| 9,835,729 | B2 | 12/2017 | Wallace et al. | |
| 2003/0189136 | A1 * | 10/2003 | Maeda | B64G 1/1007 244/158.4 |
| 2003/0214443 | A1 * | 11/2003 | Bauregger | H01Q 1/38 343/700 MS |
| 2004/0174303 | A1 * | 9/2004 | Duxbury | H01Q 1/246 343/700 MS |
| 2005/0259760 | A1 * | 11/2005 | Casabona | G01S 19/21 375/260 |
| 2006/0092079 | A1 * | 5/2006 | de Rochemont | H01Q 1/362 343/700 MS |
| 2007/0001918 | A1 * | 1/2007 | Ebling | G01S 13/931 343/753 |
| 2007/0008916 | A1 * | 1/2007 | Haugli | H04B 7/2041 370/320 |
| 2007/0080864 | A1 * | 4/2007 | Channabasappa | H01Q 9/0442 343/700 MS |
| 2009/0098870 | A1 * | 4/2009 | Vellanki | H04W 36/36 455/432.1 |
| 2009/0140930 | A1 * | 6/2009 | Tatarnikov | H01Q 9/0414 343/700 MS |
| 2010/0171667 | A1 * | 7/2010 | Knudsen | H01Q 1/243 343/702 |
| 2010/0176991 | A1 * | 7/2010 | Webber | G01S 19/32 342/357.72 |
| 2010/0231442 | A1 * | 9/2010 | Craig | H04B 7/0851 342/354 |
| 2010/0301928 | A1 * | 12/2010 | Barth | H04B 1/0028 327/557 |
| 2011/0057834 | A1 * | 3/2011 | Miller | G01S 19/37 342/357.25 |
| 2012/0229366 | A1 * | 9/2012 | Ding | H01Q 9/0414 343/907 |
| 2014/0065985 | A1 * | 3/2014 | Weissman | H04B 1/40 455/86 |
| 2014/0077865 | A1 * | 3/2014 | Ashjaee | G01S 19/21 327/513 |
| 2014/0170999 | A1 * | 6/2014 | Aparin | H03G 3/00 455/132 |
| 2014/0256278 | A1 * | 9/2014 | Ko | H04B 1/16 455/313 |
| 2014/0320376 | A1 * | 10/2014 | Ozdemir | H01Q 9/0442 343/876 |
| 2015/0022394 | A1 * | 1/2015 | McConnell | G01S 19/13 342/357.51 |
| 2016/0018529 | A1 * | 1/2016 | Wang | G01S 19/33 342/357.63 |
| 2016/0103225 | A1 * | 4/2016 | Grasso | G01S 19/36 342/357.73 |

OTHER PUBLICATIONS

Akos, Dennis M., "A Software Radio Approach to Global Navigation Satellite System REceiver Design," Ohio University, 1997.
Borre, Akos, Bertelsen, Rinder and Jensen, "A Software-Defined GPS and Galileo Receiver A Single Frequency Approach,".
Qaisar, Sana Ullah, "Receiver Strategies for GPS L2C Signal Processing," University of New South Wales, 2010.

* cited by examiner

HARDWARE FRONT-END FOR A GNSS RECEIVER

BACKGROUND

Global Navigation Satellite Systems (GNSS) such as the Global Positioning System (GPS) are used extensively throughout the developed nations of the world. They are used in military, commercial, and consumer applications in a broad range of devices.

As is well known, GPS (and other GNSSs) includes multiple signals, some designed for public/civilian use and some designed only for authorized users (e.g., the US Department of Defense). For example, the complex signals include an I signal and a Q signal that is orthogonal to the I signal. At the L1 frequency of 1575.42 MHz, the I signal may include a P(Y) code for authorized users and the Q signal may include a course/acquisition (C/A) code, an L1C code, and an M code (the latter being for authorized users). At the L2 frequency of 1227.60 MHz, the I signal may include the P(Y) code for authorized users and the Q signal may include an L2C code and an M code (the latter being for authorized users).

The highest levels of positional accuracy can be obtained from the P(Y) and M codes. A slightly-less accurate position can be obtained by using more than one of the C/A, L1C, L2C, or certain aspects of the P(Y) codes (even without knowing the code used to create the P(Y) code). GPS receivers that receive multiple ones of these signals/codes can be complex and expensive and often include custom designs. Driven partially by consumer demand, simpler, inexpensive GPS receivers have been developed that provide a reduced, but often adequate, level of positional accuracy for consumer applications. These inexpensive receivers may only receive the L1 signal and may use only the C/A or L1C code.

It is against this background that the disclosed hardware front-end for a GNSS receiver has been developed.

SUMMARY

Disclosed herein is a hardware front-end for a software-defined GNSS receiver, the front-end including an antenna; a first RF circuit that is coupled to and receives a first RF signal at a first RF frequency in a first frequency range from the antenna, and produces a first GNSS signal, the first RF circuit including: a first low-noise amplifier that amplifies the first RF signal; and a first direct conversion receiver that downconverts the first RF signal to create separate, digitized I and Q channels; a second RF circuit that is coupled to and receives a second RF signal at a second RF frequency from the antenna, and produces a second GNSS signal, wherein the second RF frequency is significantly different than the first RF frequency and is outside of the first frequency range, the second RF circuit including: a second low-noise amplifier that amplifies the second RF signal; a first bandpass filter that filters the second RF signal; an oscillator that provides a signal at an LO frequency; a mixer that is receptive of the second RF signal and receptive of the LO frequency signal and mixes the two signals to produce a third RF signal that is in the first frequency range; and a second direct conversion receiver that converts the third RF signal into separate, digitized I and Q channels; and a microcontroller that receives the separate I and Q channels from the first RF circuit and receives the separate I and Q channels from the second RF circuit and creates a digital bus signal therefrom.

The first RF frequency may be in the range of 1500-1635 MHz and the second RF frequency may be in the range of 1200-1250 MHz. The first direct conversion receiver may generate a GNSS L1 signal and the second direct conversion receiver may generate a GNSS L2 signal that has been upconverted to a frequency range of the GNSS L1 signal. The digital bus signal may be provided on a USB port.

The hardware front-end may be in further combination with a mobile computing device having a software radio thereon. The hardware front-end may further include an error correction signal circuit that is also receptive of the first RF signal and generates an error correction RF signal, the error correction signal circuit including: a second bandpass filter that filters the first RF signal; a third direct conversion receiver that converts the error correction RF signal to separate, digitized I and Q channels; wherein the I and Q channels from the third direct conversion receiver represent error correction information broadcast from one or more Earth stations via one or more satellites.

The hardware front-end may further include a diplexer that receives a signal from the antenna and provides two separate output signals, the first RF signal and the second RF signal. The diplexer may include a first transmission line tuned to the first RF frequency and a second transmission line tuned to the second RF frequency. The first and second transmission lines may be tuned to their respective frequencies by arranging for the transmission lines to each have an impedance of 50 ohms at their respective frequency. The diplexer may further include a pair of bandpass filters, a separate one of the pair that receives the signal from each of the two transmission lines.

The antenna may include a first patch antenna, a second patch antenna, a ground plane, and a dielectric material separating each of the first patch antenna, the second patch antenna, and the ground plane from each other, and wherein each of those four components may be manufactured together in one integral body. The antenna may be manufactured with a multi-layer printed circuit board process. The antenna may be conductively connected with a separately-manufactured ground plane that is significantly larger than the ground plane of the antenna.

The hardware front-end may further include a second bandpass filter upstream of the first low-noise amplifier and a third bandpass filter downstream of the first low-noise amplifier. The hardware front-end may further include a fourth bandpass filter downstream of the second low-noise amplifier and the first bandpass filter may be upstream of the second low-noise amplifier.

The first and second direct conversion receivers may digitize the RF signals they receive. The hardware front-end may further include a synchronization circuit that provides synchronization signals to the first and second direct conversion receivers to synchronize the digitizing of the RF signals.

Also disclosed is a hardware front-end for a software-defined GNSS receiver, the front-end including an antenna; a first RF circuit that is coupled to the antenna and produces a first GNSS signal, the first RF circuit including: a first transmission line coupled to the antenna; a first bandpass filter and low-noise amplifier receptive of an RF signal at a first RF frequency from the first transmission line; and a first direct conversion receiver that downconverts an RF signal from the bandpass filter and low-noise amplifier to create separate, digitized I and Q channels; a second RF circuit that is coupled to the antenna and produces a second GNSS signal, the second RF circuit including: a second transmission line coupled to the antenna; a second bandpass filter and low-noise amplifier receptive of an RF signal at a second RF frequency from the second transmission line, wherein the second RF frequency is significantly different than the first RF frequency; an oscillator that provides a signal at an LO frequency; a mixer that is receptive of an RF frequency signal from the second bandpass filter and low-noise amplifier and is receptive of the LO frequency signal and mixes the two signals to produce a third RF signal at a frequency that is similar to the first RF frequency; and a second direct conversion receiver that converts the RF signal from the mixer to separate, digitized I and Q channels; and a microcontroller that receives the separate I and Q channels from the first RF circuit and receives the separate I and Q channels from the second RF circuit and creates a digital bus signal therefrom.

Also disclosed is a hardware front-end for a software-defined GNSS receiver, the front-end including an antenna; a first RF circuit that is coupled to and receives a first RF signal at a first RF frequency in a first frequency range from the antenna, and produces a first GNSS signal, the first RF circuit including: a first low-noise amplifier that amplifies the first RF signal; and a first receiver that downconverts the first RF signal; a second RF circuit that is coupled to and receives a second RF signal at a second RF frequency from the antenna, and produces a second GNSS signal, wherein the second RF frequency is significantly different than the first RF frequency and is outside of the first frequency range, the second RF circuit including: a second low-noise amplifier that amplifies the second RF signal; a first bandpass filter that filters the second RF signal; an oscillator that provides a signal at an LO frequency; a mixer that is receptive of the second RF signal and receptive of the LO frequency signal and mixes the two signals to produce a third RF signal that is in the first frequency range; and a second receiver that downconverts the third RF signal; and a microcontroller that receives a signal from the first RF circuit and receives a signal from the second RF circuit and creates a digital bus signal therefrom.

Also disclosed is a GNSS antenna assembly that includes a multilayer antenna board containing an L1 patch antenna of a first width, an L2 patch antenna of a second width that is greater than the first width, a ground plane of a third width that is equal to or greater than the second width, and one or more electrical contact pads on a first surface of the antenna board, the contact pads being in conductive contact with the ground plane of the antenna board; a ground plane board containing a ground plane of a fourth width that is greater than the third width and one or more electrical contact pads on a first surface of the ground plane board, the contact pads being in conductive contact with the ground plane of the ground plane board; wherein the contact pads of the antenna board and the contact pads of the ground plane board are in conductive contact with each other.

There may be a plurality of contact pads on each of the antenna board and the ground plane board and the contact pads of the antenna board and the contact pads of the ground plane board are each formed in an array.

BRIEF DESCRIPTION OF THE DRAWINGS

The disclosure herein is described with reference to the following drawings, wherein like reference numbers denote substantially similar elements.

DETAILED DESCRIPTION

Figure 1:
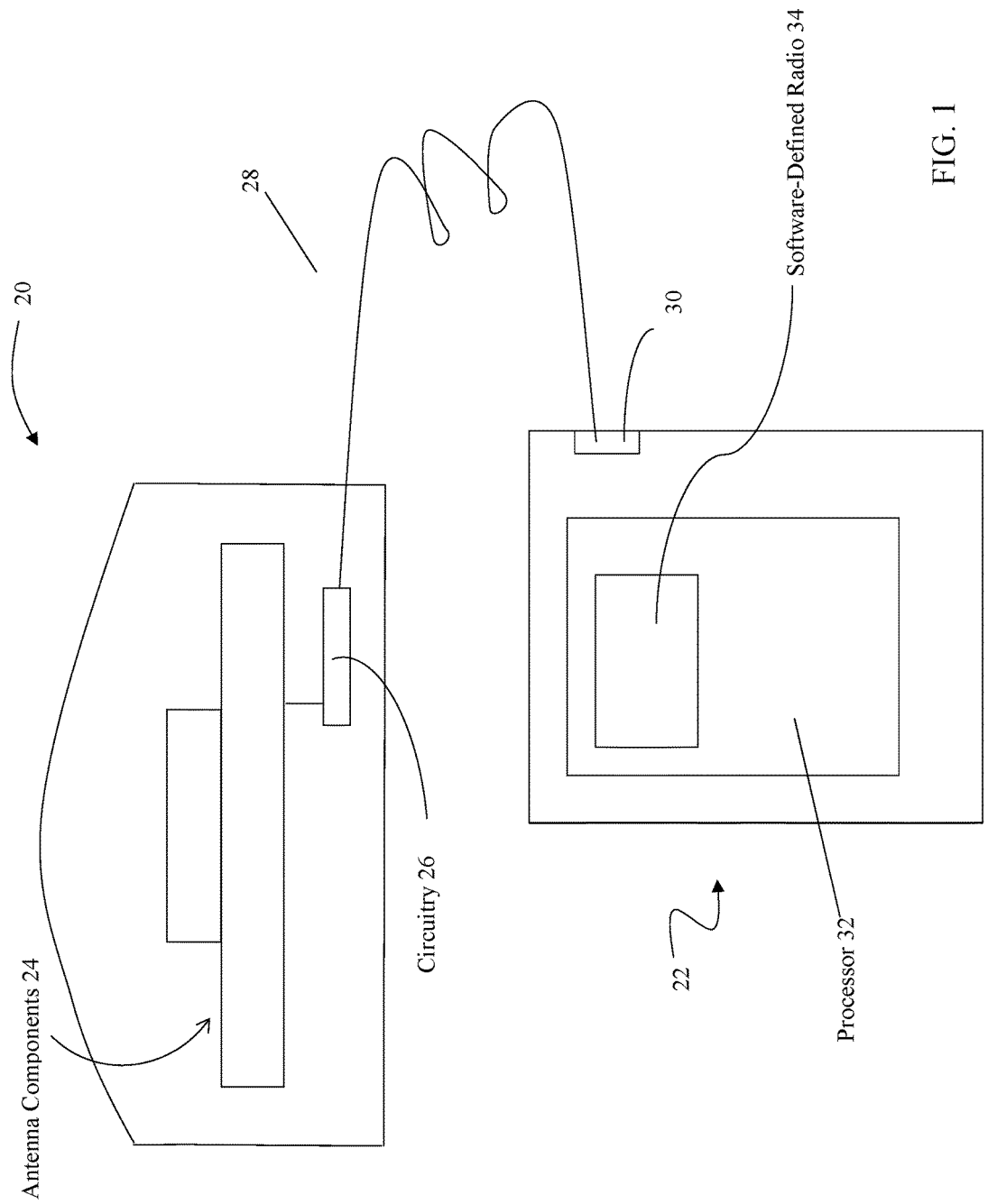
FIG. 1 is a block diagram of a system described herein.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

Disclosed herein are techniques and systems related to improved hardware front-ends for GNSS receivers. The front-end receives and processes both L1 and L2 signals, by utilizing a first circuit for receiving/processing the L1 signals and a second circuit for receiving/processing the L2 signals. An off-the-shelf single-chip GNSS "receiver" that operates at the L1 frequency and generates digitized I and Q signals is used in the first circuit. A second off-the-shelf single-chip GNSS "receiver" that operates at the L1 frequency and generates digitized I and Q signals is used in the second circuit. The second circuit also includes a mixer to convert the incoming L2 frequency signals to L1 frequency signals so that they can be received/processed by the second off-the-shelf single-chip GNSS receiver. The two GNSS receivers each output digitized I and Q signals that are provided to a microcontroller and are combined as a digitized bus signal for providing to a software-defined radio or other device for decoding the signals and providing position, velocity, and time information. The second GNSS receiver receives and processes L2 signals that have been upconverted to the L1 frequency.

One exemplary embodiment of such a system is shown in FIG. 1. An external hardware module 20 is connectable to a computing device 22. The computing device 22 may be a mobile computing device such as a smart phone (e.g., an Apple iPhone or an Android device), or it may be any other suitable computing device with functionality therein capable of decoding received and digitized GNSS signals to determine time and the position of the computing device. The external hardware module 20 may contain an antenna 24 suitable for receiving RF signals in the frequency ranges of the various types of GNSS systems. The antenna 24 may include two or more separate patch antennas. In the case of GPS, these RF signals may include 1575.42 MHz (henceforth L1 signals) and 1227.60 MHz (henceforth L2 signals).

The antenna 24 may provide RF signals to circuitry 26, which may be implemented on one or more circuit boards or other devices. The circuitry 26 generally serves to filter, amplify, receive, and digitize the L1 and L2 signals. The circuitry 26 will be described in greater detail below.

The circuitry 26 may communicate the digitized L1 and L2 signals to the computing device 22 via a cable 28, although any other suitable technique for communicating digital signals could be used, with non-limiting examples including Bluetooth, Wi-Fi, and other types of close-range wireless digital communication techniques. As one example, the cable 28 could be a Universal Serial Bus (USB) cable (e.g., USB 2.0). In such case, the cable 28 may mate with a USB port 30 on the computing device 22. Within the computing device 22, may be a processor 32 that together with associated memory and processing devices may be used to provide a Software-Defined Radio (SDR) 34 or Software-Defined GNSS Receiver. The hardware module 20 may receive electrical power via the USB cable or via some other means, or it may have on-board battery power.

Figure 2:
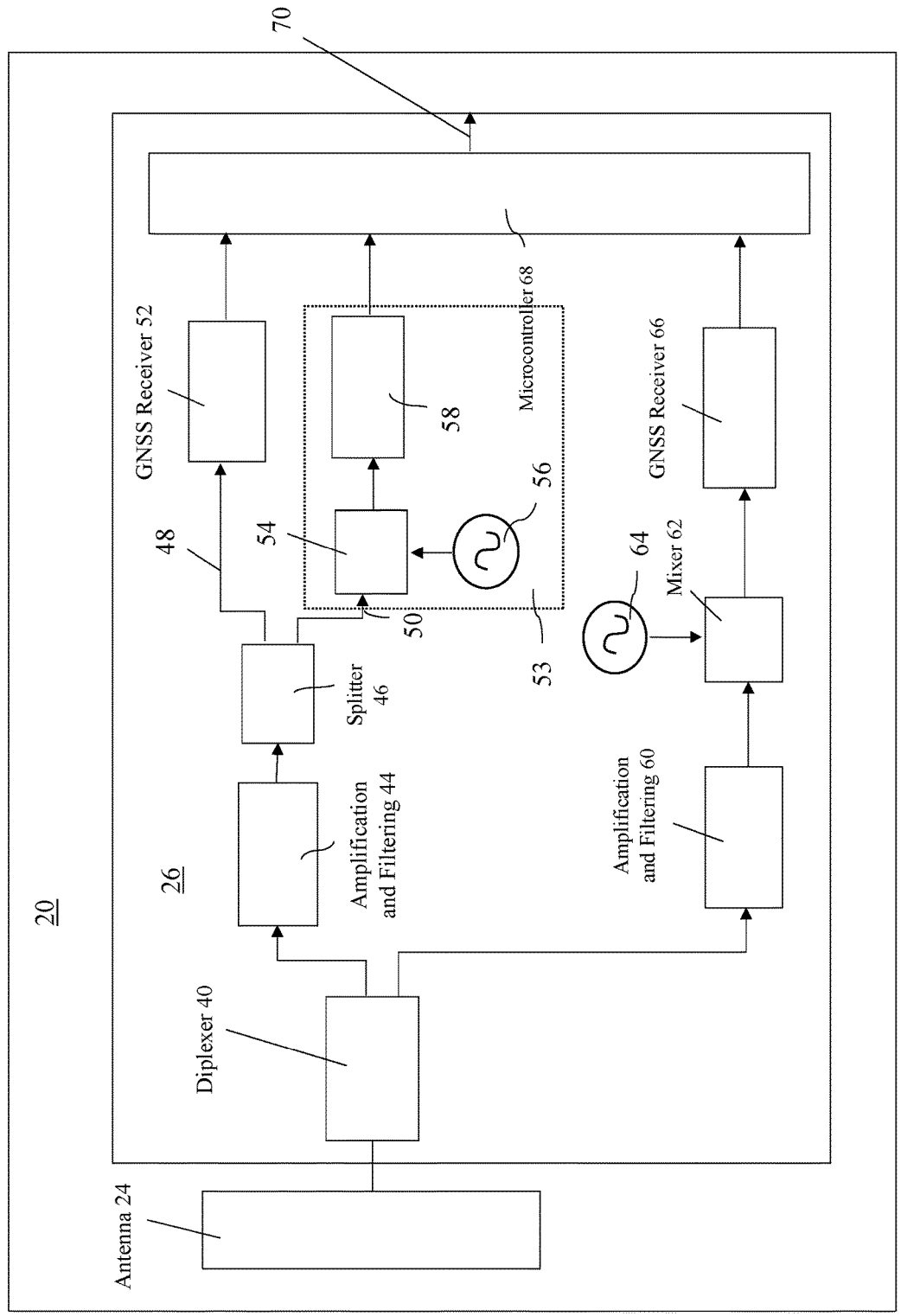
FIG. 2 is a block diagram providing detail about circuitry within a hardware module of the system.

FIG. 2 provides further detail about the hardware module 20. A signal from the antenna 24 is provided to the circuitry 26 where it is received by a diplexer 40. The diplexer can be any suitable type of diplexer that divides the signal into two different signals (a first RF signal and a second RF signal) based on the frequency components of the signal. The first RF signal may have a center frequency somewhere in the range of 1500 and 1635 MHz and be diverted in one direction by the diplexer 40. The second RF signal may have a center frequency somewhere in the range of 1217 and 1237 MHz and be diverted in another direction by the diplexer 40.

The first RF signal is provided by the diplexer 40 to a combined amplification and filtering section 44. This section 44 may include one or more low-noise amplifiers and/or one or more bandpass filters. After the amplification/filtering section 44, the RF signal is provided in the form of a first signal 48 (for example, such as from a splitter or other suitable device 46) to a first GNSS receiver 52 and in the form of a second signal 50 to an error correction signal section 53.

The first GNSS receiver 52 may provide such functionality as low-noise amplifier, mixing, filtering, programmable gain amplifier (PGA) (or a variable-gain amplifier (VGA)), voltage controlled oscillator (VCO), frequency synthesis, crystal oscillator, and multibit analog-to-digital conversion (ADC). In one embodiment, the GNSS receiver may provide two bits for each data signal. The first GNSS receiver 52 receives a GNSS signal that has been suitably filtered and amplified and it converts it to I digital signals and Q digital signals, also referred to as I and Q signals. As may be appropriate, the I and Q signals may be provided to a device such as a microcontroller 68 which incorporates the I and Q signals (from the first GNSS receiver) into a digital bus signal 70 that is provided as an output from the circuitry 26 and hardware module 20 for use by the computing device 22 (which, as discussed previously, may include the SDR) for decoding the signal information therein.

The error correction signal section 53 receives the signal 50 and provides it to a second GNSS receiver 58 which (in a manner similar to the first GNSS receiver 52, described above) may convert the signals to digitized I and Q signals that may be provided to the microcontroller 68 for incorporation into the digital bus signal 70. Bandpass filtering (and other techniques) may be provided so that the L1 GNSS signals described above are greatly filtered out (as are other signals sources that are nearby in the frequency spectrum) and certain error correction signals are received and processed by the second GNSS receiver 58. Whereas error correction signals such as those available from a Satellite-Based Augmentation Services (SBAS), such as the Wide Area Augmentation System (WAAS), may be recovered using GNSS receiver 52 in the same band as the L1 GNSS signals, receiver 58 is configured to receive proprietary correction signals in the Mobile Satellite Service (MSS) band below L1 GNSS, such as the Omnistar and RTX services available from Trimble Navigation, or other suitable similar services. The information in these signals can be used by the navigation processing in the SDR to enhance the accuracy of the position, velocity, and time determinations.

The second RF signal is provided by the diplexer 40 to a combined amplification and filtering section 60. This section 60 may include one or more low-noise amplifiers and/or one or more bandpass filters. After the amplification/filtering section 60, the RF signal is provide to a mixer 62 that receives an LO signal from a local oscillator 64 and mixes the RF signal with the LO signal to produce a higher-frequency signal 63 that is of a similar frequency to the L1 signal 48 (described above). Note that, although this signal 63 is of a frequency similar to the L1 signal 48, this signal 63 does not contain L1 information, but instead contains L2 information.

The signal 63 is provided to a third GNSS receiver 66 which (in a manner similar to the first and second receivers 52 and 58, described above) may convert the signals to digitized I and Q signals that may be provided to the microcontroller 68 for incorporation into the digital bus signal 70. Like with the I and Q signals produced by the first and second receivers 52 and 58, the I and Q signals from the third GNSS receiver are ultimately provided to the digital computing device 22 (which, as discussed previously, may include the SDR) for decoding the signal information therein.

Figure 3:
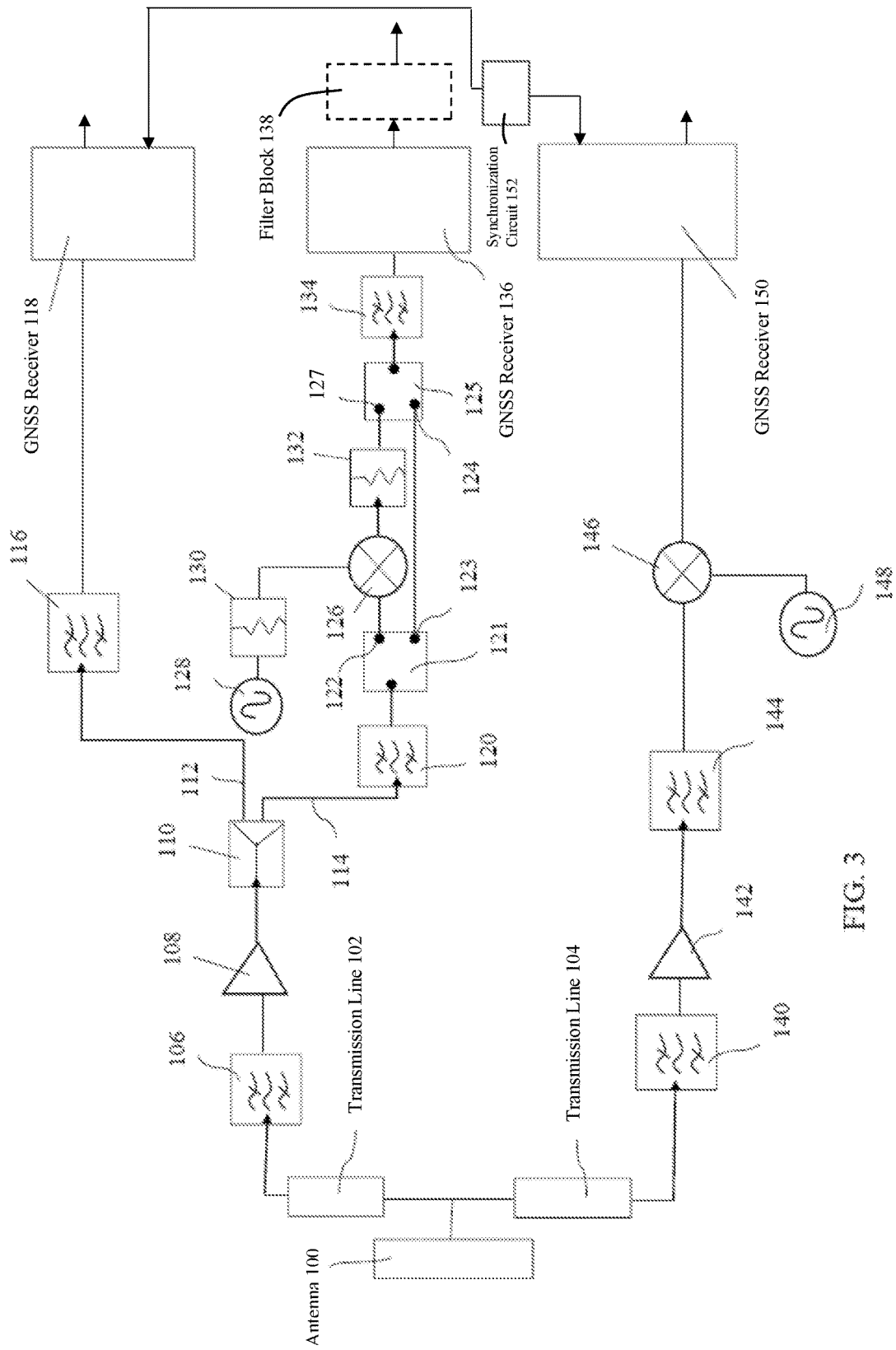
FIG. 3 is a block diagram providing further detail about circuitry within a hardware module of the system.

FIG. 3 shows an alternative block diagram. Antenna 100 may be connected to a pair of tuned transmission lines 102 and 104. The transmission lines 102 and 104 may have their respective impedances tuned so that RF signals in the range of 1500 to 1635 MHz go through transmission line 102 and RF signals in the range of 1217 to 1237 MHz go through transmission line 104. The RF signal from transmission line 102 is provided to a bandpass filter 106 that may substantially filter out signals outside of the 1500 to 1635 MHz range. One example of the filter 106 may be a TN55553, a third-order filter having an Insertion Loss of 1 dB. The filtered signal is provided to a Low Noise Amplifier (LNA) 108. One example of the LNA 108 may be a BGU8019_1, having a Gain of 18 dB and a Noise Figure of 0.55 dB. The amplified signal is provided to a splitter 110 that splits the signal into a first signal 112 and a second signal 114. One example of the splitter 110 may be a PD0922, having an Insertion Loss of 3.02 dB. The first signal 112 is provided to an optional bandpass SAW filter 116 that may substantially filter out signals outside of the 1555 to 1595 MHz range. One example of the filter 116 may be an AFS14A04_1, a third-order filter having an Insertion Loss of 1 dB. The filtered signal (or, for the case without the filter 116, the first signal 112) is then provided to a GNSS receiver 118. One non-limiting example of such a GNSS receiver may be a MAX2769 Universal GPS Receiver, such as is available from Maxim Integrated Products, Inc. Although not shown in FIG. 3, one example of a microcontroller that might receive digitized I and Q signals from the GNSS receiver 118 is an NXP LPC1830FET180, such as is available from NXP Semiconductors of Eindhoven, Netherlands. Further, the GNSS receiver could also be configured to, instead of providing I and Q signals, provide a real signal at double the sampling rate.

The second signal 114 may be provided to a bandpass SAW filter 120 that may substantially filter out signals outside of the 1510 to 1570 MHz range. One example of the filter 120 may be a TA1405A, a third-order filter having an Insertion Loss of 2.5 dB. The filtered signal may be provided to a first RF switch 121 that is operative to receive a control signal and, based thereon, provide the filtered signal to either a first port 122 or a second port 123. One example of the RF switch 121 may be a BGS12_1, having an Insertion Loss of 0.5 dB. The second port 123 is electrically connected to a first input port of a second RF switch 125. One example of the RF switch 125 may be a BGS12_2, having an Insertion Loss of 0.5 dB.

The first port 122 of the first RF switch 121 is connected to an input port of a mixer 126 that also receives an input from a Local Oscillator 128 via an attenuator 130. One example of the mixer 126 may be an LT5560f, having a Conversion Gain of 2.4 dB with an LO power level of −2 dBm. One example of the LO 128 may be from SILAB, at a frequency of 51.88 MHz and having a power level of 10 dBm. The attenuator 130 may attenuate the power level by 15 dB. The mixer 126 mixes the filtered signal with the attenuated LO signal and produces an output that is shifted up in frequency by an amount (e.g., 54 MHz). For example, the primary components in the signal 114 may be in the range of 1510 MHz-1560 MHz and, after upconversion, may be in the range of 1560 MHz-1610 MHz. The upconverted signal from the mixer is optionally attenuated by an attenuator 132 (attenuating by 0-5 dB) and provided to a second input port 127 of the second RF switch 125. Based on a control signal provided to the second RF switch 125, the signal from one of the input ports is provided as an output to the second RF switch 125. This selected signal is provided to a bandpass SAW filter 134, which may substantially filter out signals outside of the 1555 to 1610 MHz range. One example of the filter 134 may be a B8813_96364, a third-order filter having an Insertion Loss of 1 dB. The filtered signal from the bandpass filter 134 may be provided to a second GNSS receiver 136 which provides either digitized I and Q signals therefrom, or to avoid unnecessary sampling rates and processing overhead, the signal may alternately be provided from receiver 136 as an analog baseband signal for subsequent low pass filtering (by an optional analog filter block 138 between receiver 58 (136) and microcontroller 68) and analog to digital conversion by microcontroller 68. As can be appreciated, the term GNSS receiver is used herein even when the signals are not exactly GNSS signals because of the frequency shifting discussed or because they are actually error correction signals. Also, the examples discussed herein include direct conversion receivers, but they could be any other suitable type, such as multi-stage receivers. As another variation, this same arrangement could be used with L1/L5 signals instead of L1/L2 signals. This may be useful as the Galileo GNSS system comes online.

The RF switches 121 and 125 are used to select between use of the hardware module 20 in North America versus in the Rest of the World (RoW). In the case of use within North America, the RF switches 121 and 125 are controlled to pass the filtered signal from the bandpass filter 120 to the bandpass filter 134, further reducing the bandwidth of signals reaching receiver 136. In the case of use within the RoW, the RF switches 121 and 125 are controlled to pass the filtered signal from the bandpass filter 120 to the mixer 126, so that they can be upconverted by 51.88 MHz prior to passing to the bandpass filter 134. The choice of Local Oscillator (LO) frequency 128 allows the desired signal to be received within the specified operational frequency range of receiver 136. While it might be preferable for the error correction signal to be provided in the range of 1540 MHz, there are various other signal sources that exist in North America that have driven the designers to receive the error correction signal at a higher frequency to avoid interference with those other signal sources.

The RF signal from transmission line 104 is provided to a bandpass SAW filter 140 that may substantially filter out signals outside of the 1217 to 1237 MHz range. One example of the filter 140 may be a TQ857141, a third-order filter having an Insertion Loss of 0.5 dB. The filtered signal is provided to a Low Noise Amplifier (LNA) 142. One example of the LNA 142 may be a BGU8019_2, having a Gain of 17 dB and a Noise Figure of 0.55 dB. The amplified signal is provided to a bandpass SAW filter 144 that may substantially filter out signals outside of the 1217 to 1237 MHz range. One example of the filter 144 may be an AFS20A20_1227, a third-order filter having an Insertion Loss of 1.6 dB. The filtered signal is provided to an input port of a mixer 146 that also receives an LO input signal from a Local Oscillator 148. The mixer 146 may have a Conversion Gain of 8 dB with an LO power level of −5 dBm. The LO 148 may provide a signal at a frequency of 344 MHz and having a power level of −5 dBm. The frequency of the LO signal may upconvert the filtered signal from the 1217 to 1237 MHz range to the 1561 to 1581 range so that it may serve as an input to a third GNSS receiver 150 (which provides digitized I and Q signals therefrom). It may be desirable to synchronize the operation of the first receiver 118 and the second receiver 150, specifically the ADC sampling of the L1 signals and L2 signals, respectively. In such case, an optional synchronization circuit 152 (e.g., a clock) could be provided that provides synchronization signals to receivers 118 and 150.

Figure 4:
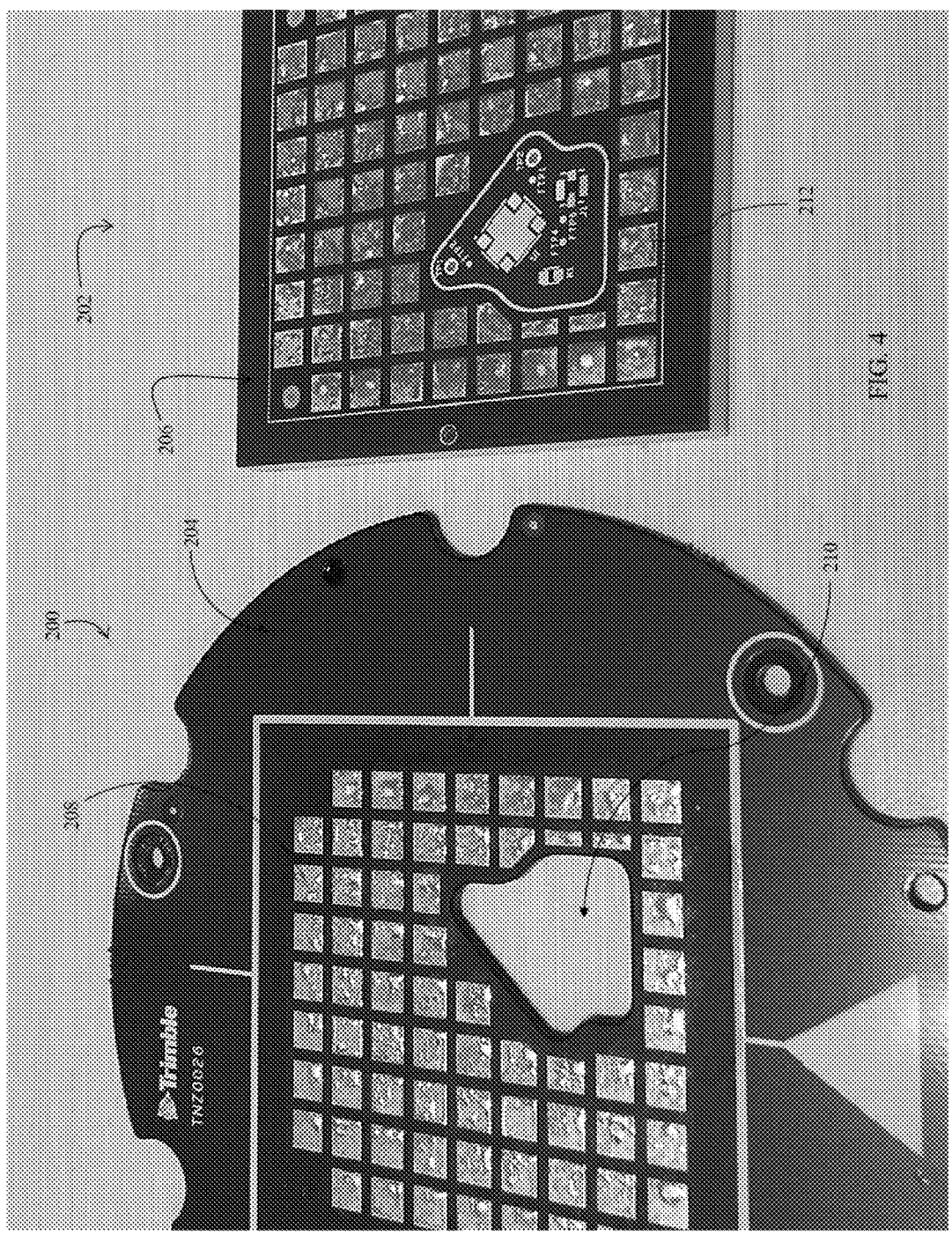
FIG. 4 is a view of certain major components of the antenna assembly, prior to assembly.
Figure 5:
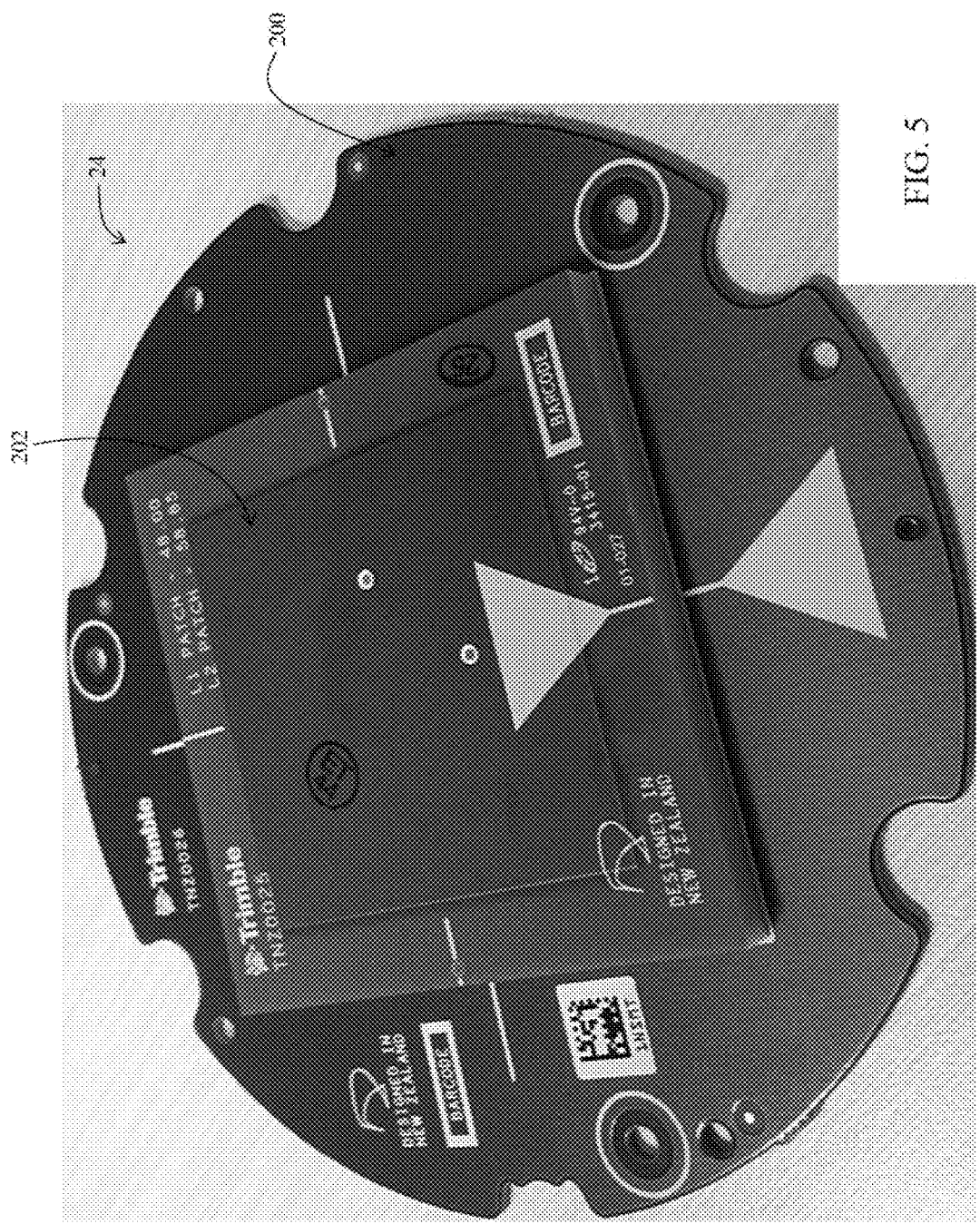
FIG. 5 is a view of certain major components of the antenna assembly, after assembly.
Figure 6:
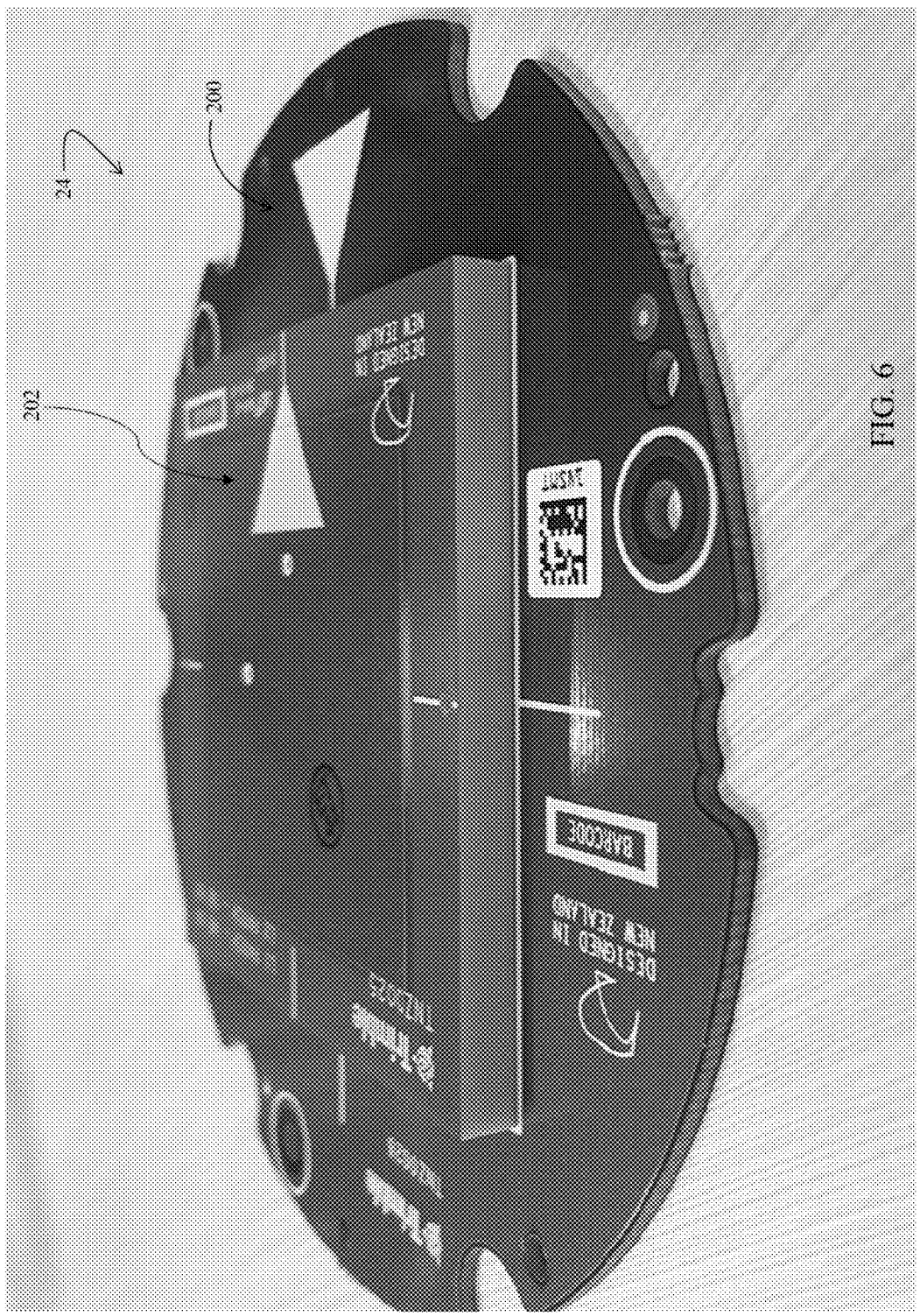
FIG. 6 is a view of portions of the antenna assembly, from close to a side view.
Figure 7:
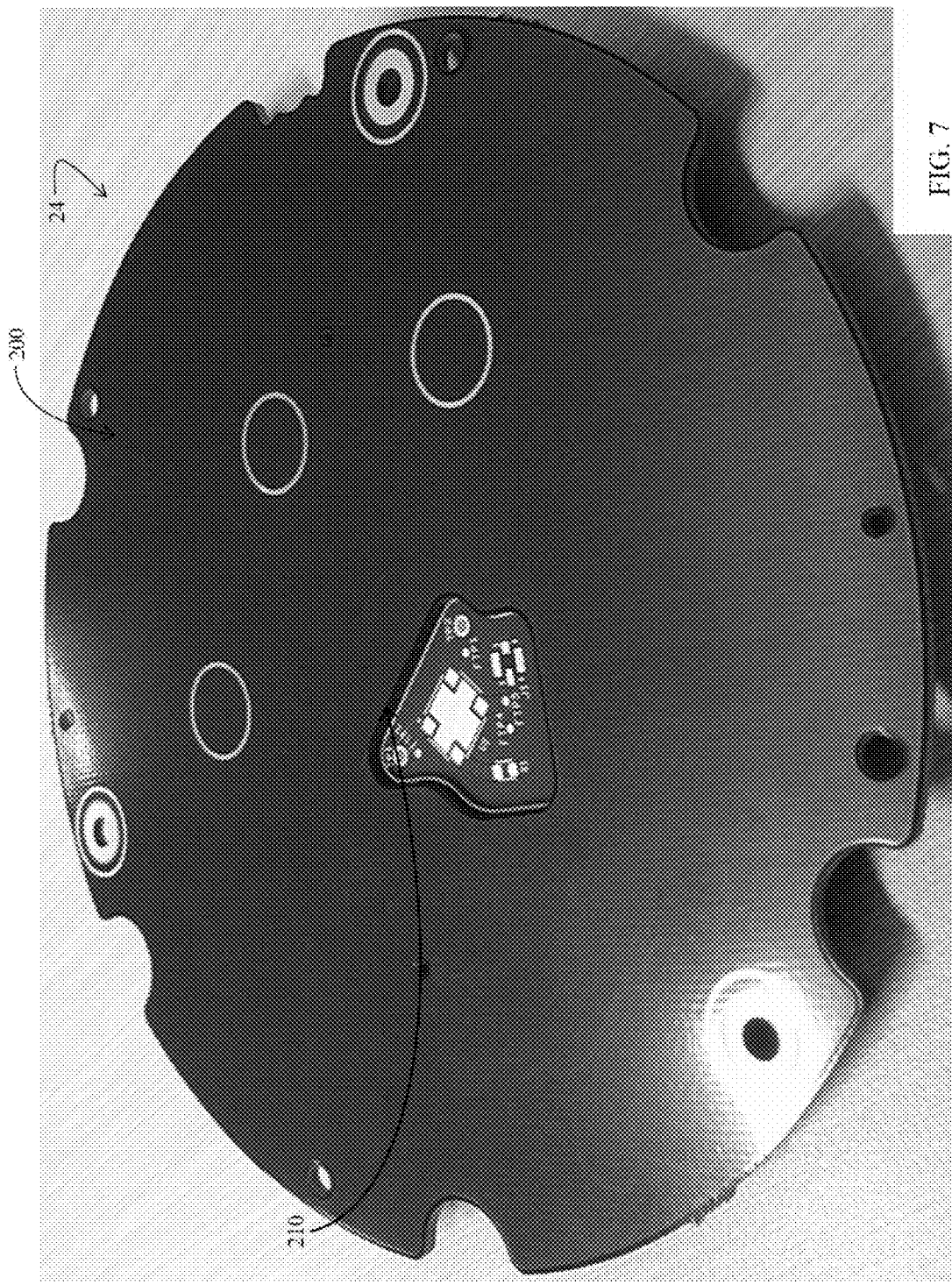
FIG. 7 is a view of portions of the antenna assembly, from an underside thereof.

FIG. 4 is an illustration of the major components of the antenna 24. A ground plane board 200 is shown next to an antenna board 202. The ground plane board 200 has a top side 204 and the antenna board 202 has a bottom side 206, each of which are shown in FIG. 4. The boards 200 and 202 are configured so as to be attachable to each other via their respective sides 204 and 206, as is shown in FIGS. 5 and 6. The top side 204 of the ground plane board 200 includes an array of electrical contact pads 208 with a cutout 210 defined within the array. The bottom side 206 of the antenna board 202 includes an array of electrical contact pads 212. The GNSS receivers and other components can be mounted on the bottom side 206, such as in an open area in the array. Optionally, as shown in FIGS. 4 and 7, the bottom side 206 may also include a number of test points and the like for testing.

Figure 8:
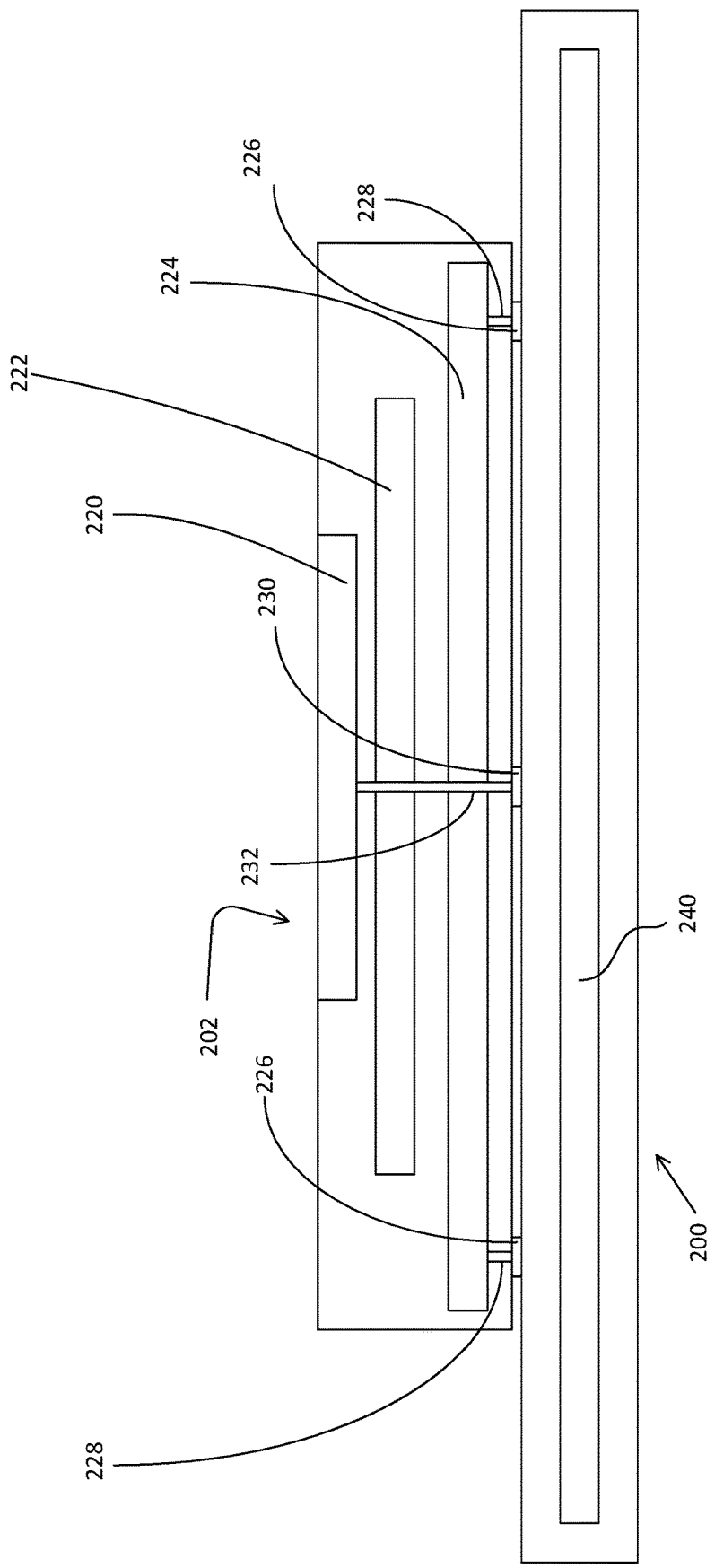
FIG. 8 is a simplified cross-sectional view of the antenna board of the antenna assembly.

As shown in FIG. 8, the antenna board 202 may be a multilayer circuit board with an L1 patch 220 (appropriately sized so as to receive signals in the frequency range around 1575.42 MHz), a larger L2 patch 222 (appropriately sized so as to receive signals in the frequency range around 1227.60 MHz), and a ground plane 224. The ground plane 224 forms electrical contact pads 212 using openings in the solder mask. The L1 patch 220 is connected to one or more external contact pads 230 by plated vias 232 (which do not contact the ground plane 224). In one embodiment, the L2 patch 222 is not conductively connected to any external contact pads; instead the L2 patch 222 may be capacitively coupled to the L1 patch 220.

It may be desirable for the ground plane of the antenna 24 to be wider than the ground plane 224 of the antenna board 202. One added benefit of a wider ground plane is that such an antenna may be better able to reject signals that reflect off the ground before reaching the antenna. By receiving only signals arriving directly from the GNSS satellites and rejecting reflected signals, the position, velocity, and time GNSS measurements can be more accurate. Another added benefit of a wider ground plane is increased gain.

While it may be possible to simply make the antenna board 202 wider, so as to allow the ground plane to be wider, the characteristics of the multilayer nature of the antenna board 202 may make it expensive to produce. For this reason, it has been found that the ground plane can be significantly widened by attaching the antenna board 202 to a wider ground plane board 200, particularly in the case where the characteristics of the ground plane board make it less expensive to produce than the antenna board 202. In the case of the disc-shaped ground plane board 200 shown in FIGS. 4-7, an extended ground plane 240 within the board 200 can extend for the entire width of the board and thus be much wider than the ground plane 224 of the antenna board 202. In this manner, the ground plane 224 of the antenna board 202 is effectively extended by connection to the extended ground plane 240 within the board 200 by the connection of the electrical contact pads 208 and 212 to each other.

In the embodiment shown, the circuitry 26 is implemented on a processing board that is separate from the antenna board 202 and ground plane board 200. However, it is equally possible that the processing board could be sandwiched against one of the ground plane board or the antenna board, or that the circuitry could be implemented on layers within or on the surface of either the ground plane board or the antenna board. For example (as mentioned previously), the circuitry 26 could be implemented in the area of the antenna board 202 that corresponds with the cutout 210 in the ground plane board 200.

Prior art antennas have typically produced the L1 patch antenna and L2 patch antennas separately and then attached them to each other via adhesive. Further, feed pins were manually soldered to each patch to bring the electrical connections out to a common surface. Then the ground plane was attached with a separate adhesive layer. It was not easy to control the amount and consistent application of adhesive. In the manner described herein, the L1 patch antenna, the L2 patch antenna, and the ground plane are all fixed relative to each other via a multilayer circuit board process which provides for the two patches to be precisely separated by a fixed amount of dielectric material, and for the ground plane to be similarly precisely separated from the L2 patch by a fixed amount of dielectric material.

The Software Defined Radio will perform the known functions of tracking loops, correlators, decoding, and loop control, as well as Real Time Kinematics and ambiguity resolution. Some examples of teachings for how to implement a Software Defined Radio in the computing device 22 is "A Software Radio Approach To Global Navigation Satellite System Receiver Design" by Dennis M. Akos, Ohio University, 1997; "A Software-Defined GPS and Galileo Receiver A Single Frequency Approach" by Borre, Akos, Bertelsen, Rinder, and Jensen; and "Receiver Strategies for GPS L2C Signal Processing" by Sana Ullah Qaisar, University of New South Wales, 2010, the entire contents of each of which are incorporated herein by reference.

Figure 9:
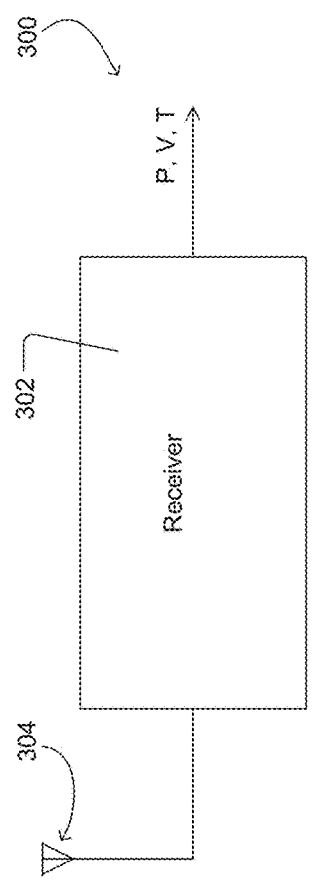
FIG. 9 is a first implementation for receiving GNSS signals.
Figure 10:
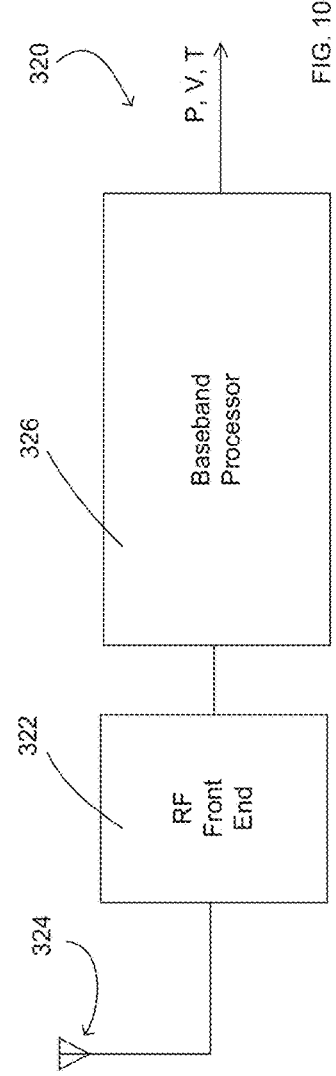
FIG. 10 is a second implementation for receiving GNSS signals.
Figure 11:
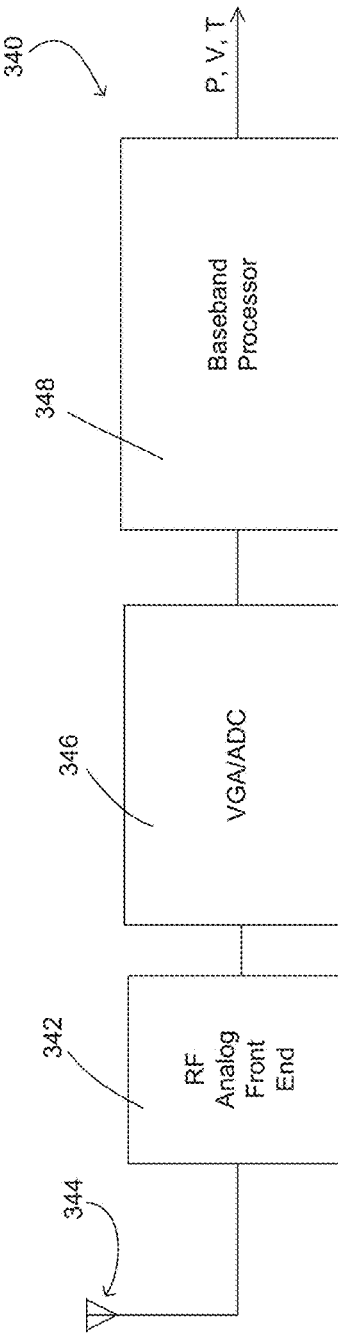
FIG. 11 is a third implementation for receiving GNSS signals.

It should be understood that the term "receiver" is used in the industry to apply to various different configurations. FIG. 9 shows an all-in-one approach 300 where a receiver 302 receives a signal from an antenna 304 and provides Position, Velocity, and Time therefrom with known GNSS techniques. FIG. 10 shows an approach 320 where an RF Front End 322 receives a signal from an antenna 324 and provides baseband signals to a Baseband Processor 326 which provides Position, Velocity, and Time therefrom with known GNSS techniques. In the case of approach 320, the term receiver may be used to describe either the RF Front End 322, the Baseband Processor 326, or the combination of the two. FIG. 11 shows an approach 340 where an RF Analog Front End 342 receives a signal from an antenna 344 and provides signals to a combined Variable-Gain Amplifier and Analog-to-Digital Converter device 346 which provides digitized baseband signals to a Baseband Processor 348 which provides Position, Velocity, and Time therefrom with known GNSS techniques. In the case of approach 340, the term receiver may be used to describe either the RF Analog Front End 342, the combined Variable-Gain Amplifier and Analog-to-Digital Converter device 346, the Baseband Processor 348, or any combination of the three.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A hardware front-end for a software-defined GNSS receiver, the front-end comprising:
   an antenna;
   a first RF circuit that is coupled to and receives a first RF signal at a first RF frequency in a first frequency range from the antenna, and produces a first GNSS signal, the first RF circuit including:
      a first low-noise amplifier that amplifies the first RF signal; and
      a first direct conversion receiver that downconverts the first RF signal to create separate, digitized I and Q channels;
   a second RF circuit that is coupled to and receives a second RF signal at a second RF frequency from the antenna, and produces a second GNSS signal, wherein the second RF frequency is significantly different than the first RF frequency and is outside of the first frequency range and wherein the first RF frequency is in the range of 1500-1635 MHz and the second RF frequency is in the range of 1200-1250 MHz, the second RF circuit including:
      a second low-noise amplifier that amplifies the second RF signal;
      a first bandpass filter that filters the second RF signal;
      an oscillator that provides a signal at an LO frequency;
      a mixer that is receptive of the second RF signal and receptive of the LO frequency signal and mixes the two signals to produce a third RF signal that is in the first frequency range; and
      a second direct conversion receiver that converts the third RF signal into separate, digitized I and Q channels; and
   a microcontroller that receives the separate I and Q channels from the first RF circuit and receives the separate I and Q channels from the second RF circuit and creates a digital bus signal therefrom, wherein the first direct conversion receiver generates a GNSS L1 signal and the second direct conversion receiver generates a GNSS L2 signal that has been upconverted to a frequency range of the GNSS L1 signal to allow combination of L2 information in the GNSS L2 signal with L1 information of the GNSS L1 signal provided in the digital bus signal.

2. A hardware front-end as defined in claim 1, wherein the digital bus signal is provided on a USB port.

3. A hardware front-end as defined in claim 1, in further combination with a mobile computing device having a software radio thereon.

4. A hardware front-end as defined in claim 1, further including an error correction signal circuit that is also receptive of the first RF signal and generates an error correction RF signal, the error correction signal circuit including:
  a second bandpass filter that filters the first RF signal;
  a third direct conversion receiver that converts the error correction RF signal to separate, digitized I and Q channels;
  wherein the I and Q channels from the third direct conversion receiver represent error correction information broadcast from one or more Earth stations via one or more satellites.

5. A hardware front-end as defined in claim 1, further including a diplexer that receives a signal from the antenna and provides two separate output signals, the first RF signal and the second RF signal.

6. A hardware front-end as defined in claim 5, wherein the diplexer includes a first transmission line tuned to the first RF frequency and a second transmission line tuned to the second RF frequency.

7. A hardware front-end as defined in claim 6, wherein the first and second transmission lines are tuned to their respective frequencies by arranging for the transmission lines to each have an impedance of 50 ohms at their respective frequency.

8. A hardware front-end as defined in claim 6, wherein the diplexer further includes a pair of bandpass filters, a separate one of the pair that receives the signal from each of the two transmission lines.

9. A hardware front-end as defined in claim 1, wherein the antenna includes a first patch antenna, a second patch antenna, a ground plane, and a dielectric material separating each of the first patch antenna, the second patch antenna, and the ground plane from each other, and wherein each of those four components are manufactured together in one integral body.

10. A hardware front-end as defined in claim 9, wherein the antenna is manufactured with a multi-layer printed circuit board process.

11. A hardware front-end as defined in claim 10, wherein the antenna is conductively connected with a separately-manufactured ground plane that is significantly larger than the ground plane of the antenna.

12. A hardware front-end as defined in claim 1, further including a second bandpass filter upstream of the first low-noise amplifier and a third bandpass filter downstream of the first low-noise amplifier.

13. A hardware front-end as defined in claim 1, further including a fourth bandpass filter downstream of the second low-noise amplifier and wherein the first bandpass filter is upstream of the second low-noise amplifier.

14. A hardware front-end as defined in claim 1, wherein the first and second direct conversion receivers digitize the RF signals they receive.

15. A hardware front-end as defined in claim 14, further including a synchronization circuit that provides synchronization signals to the first and second direct conversion receivers to synchronize the digitizing of the RF signals.

16. A hardware front-end for a software-defined GNSS receiver, the front-end comprising:
  an antenna;
  a first RF circuit that is coupled to the antenna and produces a first GNSS signal, the first RF circuit including:
    a first transmission line coupled to the antenna;
    a first bandpass filter and low-noise amplifier receptive of an RF signal at a first RF frequency from the first transmission line, wherein the first RF frequency is in the range of 1500-1635 MHz; and
    a first direct conversion receiver that downconverts an RF signal from the bandpass filter and low-noise amplifier to create separate, digitized I and Q channels;
  a second RF circuit that is coupled to the antenna and produces a second GNSS signal, the second RF circuit including:
    a second transmission line coupled to the antenna;
    a second bandpass filter and low-noise amplifier receptive of an RF signal at a second RF frequency from the second transmission line, wherein the second RF frequency is in the range of 1200-1250 MHz;
    an oscillator that provides a signal at an LO frequency;
    a mixer that is receptive of an RF frequency signal from the second bandpass filter and low-noise amplifier and is receptive of the LO frequency signal and mixes the two signals to produce a third RF signal at a frequency that is similar to the first RF frequency and in the range of 1500-1635 MHz; and
    a second direct conversion receiver that converts the RF signal from the mixer to separate, digitized I and Q channels; and
  a microcontroller that receives the separate I and Q channels from the first RF circuit and receives the separate I and Q channels from the second RF circuit and creates a digital bus signal therefrom that includes L1 and L2 information.

17. A hardware front-end for a software-defined GNSS receiver, the front-end comprising:
  an antenna;
  a first RF circuit that is coupled to and receives a first RF signal at a first RF frequency in a first frequency range from the antenna of 1500-1635 MHz, and produces a first GNSS signal, the first RF circuit including:
    a first low-noise amplifier that amplifies the first RF signal; and
    a first receiver that downconverts the first RF signal;
  a second RF circuit that is coupled to and receives a second RF signal at a second RF frequency from the antenna, and produces a second GNSS signal, wherein the second RF frequency is in the range of 1200-1250 MHz, the second RF circuit including:
    a second low-noise amplifier that amplifies the second RF signal;
    a first bandpass filter that filters the second RF signal;
    an oscillator that provides a signal at an LO frequency;

a mixer that is receptive of the second RF signal and receptive of the LO frequency signal and mixes the two signals to produce a third RF signal that is in the first frequency range; and a second receiver that downconverts the third RF signal; and a microcontroller that receives a signal from the first RF circuit and receives a signal from the second RF circuit and creates a digital bus signal therefrom providing both L1 and L2 signal information.

18. A hardware front-end as defined in claim 1, wherein first RF frequency range is higher in frequency than the second RF frequency range, so that the third RF signal that is produced by the mixer is of a higher frequency than the second RF signal.

19. A hardware front-end as defined in claim 1, wherein the antenna comprises an antenna board with an L1 patch for receiving the first RF signal and an L2 patch for receiving the second RF signal and wherein the L2 patch is spaced apart from and wider than the L1 patch.

20. A hardware front-end as defined in claim 19, wherein the antenna further comprises a ground plane spaced apart from and wider than the L2 patch.

21. A hardware front-end as defined in claim 19, wherein the L2 patch is capacitively coupled to the L1 patch.

* * * * *